(No Model.)

E. N. OUALLINE.
Wheel Hub.

No. 235,450. Patented Dec. 14, 1880.

WITNESSES:
C. Neveux
C. Sedgwick

INVENTOR:
E. N. Oualline
BY Munn & Co
ATTORNEYS.

N. PETERS, PHOTO-LITHOGRAPHER, WASHINGTON, D. C.

ced by the nuts $m$, screwed on the bolts D.
UNITED STATES PATENT OFFICE.

EDWARD N. OUALLINE, OF HOCKLEY, TEXAS.

WHEEL-HUB.

SPECIFICATION forming part of Letters Patent No. 235,450, dated December 14, 1880.

Application filed August 19, 1880. (No model.)

*To all whom it may concern:*

Be it known that I, EDWARD N. OUALLINE, of Hockley, in the county of Harris and State of Texas, have invented a new and Improved Wheel-Hub, of which the following is a specification.

The object of this invention is to obviate the necessity of removing the wheel-tire for replacing a broken spoke with a new one.

Figure 1:
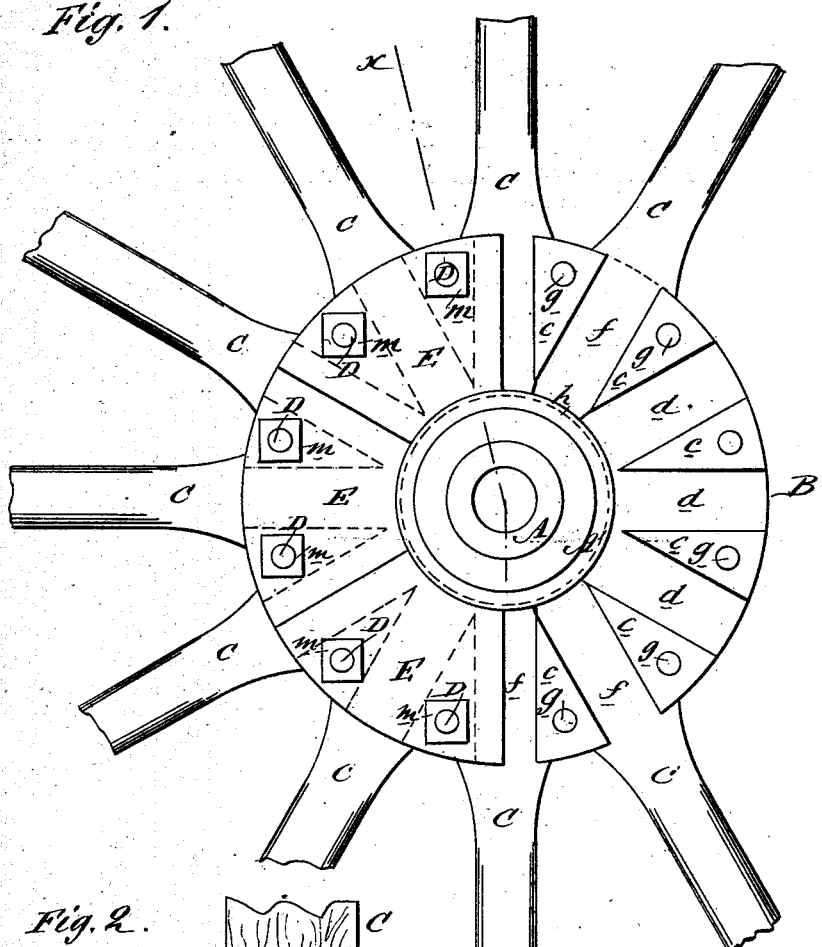
Figure 3:
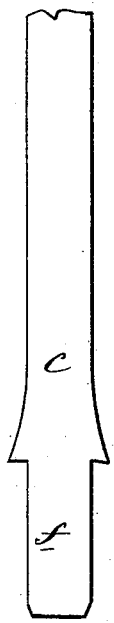
Figure 2:
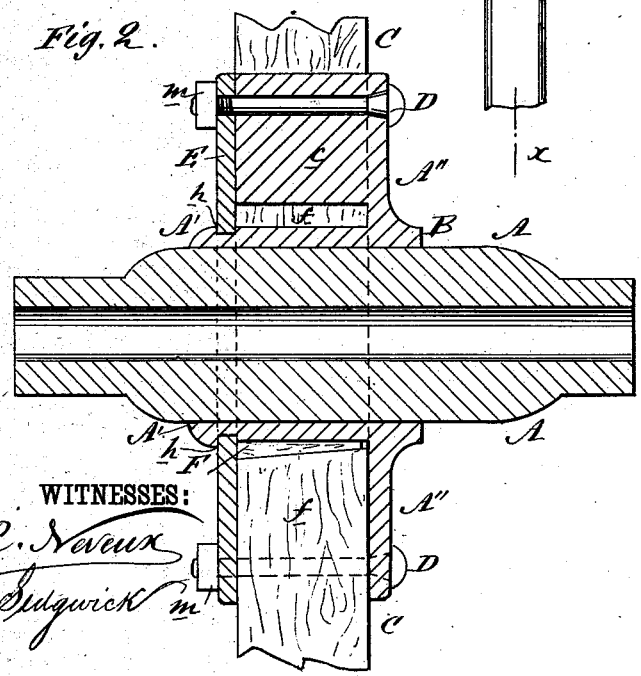
Figure 4:
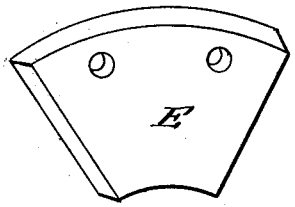

Figure 1 is a front elevation of the improved hub with some of the segmental plates removed and with several spokes inserted therein. Fig. 2 is a sectional elevation of the same on line $x$ $x$, Fig. 1. Fig. 3 is an elevation of a portion of a spoke. Fig. 4 is a perspective view of a segmental front plate.

Similar letters of reference indicate corresponding parts.

In the drawings, A represents the wooden center of the hub, and B the cylindrical flanged casting, consisting of cylinder A', fitting over and upon the hub-center A, and provided at one end with an annular flange, A'', containing or having on its inner face a series of triangular abutments, $c$, that form the spoke-mortises $d$, said mortises $d$ being of equal depth with the tenons $f$ of the spokes C, and said abutments $c$ being provided with suitable bolt-holes, $g$, to receive the bolts D, that secure the segmental plates E to the face of the said hub. The cylindrical portion A' of the casting B is provided near one end with an annular groove, $h$, into which the smaller and concave ends of the segmental plates E E are entered when said plates E E are in place, secured by the nuts $m$, screwed on the bolts D. The spokes C being set in place, with their tenons $f$ in the mortises $d$, the segmental plates E are put in position, with their smaller ends engaged in the annular groove $h$, and are then securely fastened down by the bolts and nuts D $m$. Should a spoke, C, break, a corresponding plate, E, is removed, the spoke taken out and another spoke put in its place, and the plate E again fastened down.

Should a spoke, C, become loose in the hub or felly of the wheel, a wedge, F, is driven between the butt of the said spoke C and the cylindrical portion A' of the hub, as shown in Fig. 2, whereby said spoke C is tightened and prevented from rattling.

The advantages of this hub are its cheapness and simplicity and the facilities it affords for replacing and tightening the spokes, felly, and tire.

Having thus described my invention, what I claim as new, and desire to secure by Letters Patent, is—

In a sectional hub, each spoke-socket having a separate side opening closed by a plate, E, fitting into an annular groove, $h$, of the cylinder A', and held by bolts passing between the tenons of spokes, to allow each spoke to be separately reached and tightened by a wedge under the end of its tenon, as shown and described.

EDWARD NAPOLEON OUALLINE.

Witnesses:
FRANK JASSERAND,
ELBERT A. BOONE.